United States Patent
Sato et al.

(10) Patent No.: US 6,718,837 B2
(45) Date of Patent: Apr. 13, 2004

(54) DRIVING UNIT FOR PRESSURE APPLICATION SHAFT IN A WELDING APPARATUS

(75) Inventors: Yoshio Sato, Ayase (JP); Yoshiyuki Sasaki, Ayase (JP)

(73) Assignee: Obara Corporation, Kanagawa-ken (JP)

( * ) Notice: Subject to any disclaimer, the term of this patent is extended or adjusted under 35 U.S.C. 154(b) by 0 days.

(21) Appl. No.: 10/436,735

(22) Filed: May 13, 2003

(65) Prior Publication Data

US 2003/0196502 A1 Oct. 23, 2003

Related U.S. Application Data

(63) Continuation of application No. 09/796,018, filed on Feb. 28, 2001.

(30) Foreign Application Priority Data

Mar. 1, 2000 (JP) ........................ 2000-055143

(51) Int. Cl.[7] ............... F16H 25/20; B23K 11/00
(52) U.S. Cl. ................ 74/89.33; 74/89.23; 219/86.25
(58) Field of Search ............... 74/89.23, 89.34, 74/89.33, 89.32, 608, 609; 228/45, 51, 234.1; 219/86.25, 86.32

(56) References Cited

U.S. PATENT DOCUMENTS

| | | | |
|---|---|---|---|
| 4,147,073 A | 4/1979 | Mercier | 49/139 |
| 4,271,733 A | 6/1981 | Stone | 82/113 |
| 4,715,241 A | 12/1987 | Lipinski et al. | 74/89.31 |
| 5,170,675 A | 12/1992 | Kawashima | 74/89.33 |
| 5,549,015 A | 8/1996 | Aiso et al. | 310/112 |
| 5,713,244 A | 2/1998 | Ito et al. | 108/143 |
| 5,747,896 A | 5/1998 | Nagai et al. | 310/20 |
| 6,000,292 A | 12/1999 | Nagai et al. | 277/634 |
| 6,145,395 A | 11/2000 | Swanson et al. | 384/55 |
| 6,191,548 B1 | 2/2001 | Kajita et al. | 318/568.18 |
| 6,223,971 B1 | 5/2001 | Sato | 228/12 |
| 6,327,924 B2 | 12/2001 | Nagai et al. | 74/89.33 |
| 6,337,456 B1 | 1/2002 | Taniguchi et al. | 219/86.25 |

FOREIGN PATENT DOCUMENTS

| | | |
|---|---|---|
| JP | 09-047881 | 2/1997 |
| JP | 2001-1156 | 6/1999 |
| JP | 2001-170775 | 12/1999 |

*Primary Examiner*—David A. Bucci
*Assistant Examiner*—Julie K. Smith
(74) *Attorney, Agent, or Firm*—Flynn, Thiel, Boutell & Tanis, P.C.

(57) ABSTRACT

A driving unit for a pressure application shaft in a welding apparatus including a housing for housing therein a ball screw mechanism for converting rotation of an output shaft of a motor into reciprocating motion of the pressure application shaft, and a direct acting type rolling guide mechanism provided between the pressure application shaft and the housing. The housing includes a housing body which is opened at one side, and a plate for covering the opened portion. The ball screw mechanism, the pressure application shaft member, the rolling bearing which is fixed to the pressure application shaft member, and a rail combined with the rolling bearing are fixed to the housing body.

16 Claims, 2 Drawing Sheets

DRIVING UNIT FOR PRESSURE APPLICATION SHAFT IN A WELDING APPARATUS

This is a continuation of application Ser. No. 09/796,018, filed on Feb. 28, 2001.

BACKGROUND OF THE INVENTION

1. Field of the Invention

The invention relates to a driving unit for pressure application shaft to be driven by a motor in a welding apparatus, wherein a ball screw mechanism for converting rotation of an output shaft of the motor into a reciprocating motion of the pressure application shaft is housed in a housing and a direct acting type rolling guide mechanism is provided between the pressure application shaft for holding the ball screw mechanism and the housing.

2. Related Art

A driving unit for pressure application shaft in a welding gun connected to a wrist of a robot has been conventionally disclosed in, for example, Japanese Patent Laid-Open Publication No. 9-47881, wherein a ball screw mechanism for converting rotation of an output shaft of the motor into a reciprocating motion of the pressure application shaft is housed in a housing and a direct acting type rolling guide mechanism is provided between a pressure application shaft member and the housing.

In this known driving unit for pressure application shaft, the pressure application shaft for holding the ball screw mechanism is arranged inside a cylinder constituting the housing, a ball box constituting the direct acting type rolling bearing is fixed to the rear end of the pressure application shaft, and a rail provided with a guide groove at the face confronting the ball box is fixed to the inner wall of the cylinder, whereby these components are assembled inside the cylinder, thereby completing the driving unit for pressure application shaft.

However, in the prior art, since the driving unit for pressure application shaft comprising the rail, the bearing, the ball screw mechanism, and so forth are assembled in the housing, an assembling process thereof is troublesome. Hence, it is difficult to manufacture a product having high accuracy, which results in high manufacturing costs.

SUMMARY OF THE INVENTION

The invention has been developed to solve the foregoing problem of the prior art, and has an object to provide a driving unit for pressure application shaft in a welding apparatus having components constituting the driving unit for pressure application shaft which are integrally assembled with one another, wherein the driving unit for pressure application shaft is integrally fixed to a housing body. A driving unit for pressure application shaft having a high accuracy is therefore achieved at a low cost.

To achieve the above object, the driving unit for pressure application shaft in a welding apparatus driven by a motor according to the invention includes a housing 8 for housing therein a ball screw mechanism 11 for converting rotation of an output shaft of a motor 1 into reciprocating motion of a pressure application shaft 7, and a direct acting type rolling guide mechanism 12, 13 provided between a pressure application shaft member and the housing 8. The housing 8 comprises a housing body 9 which is opened at one side and has a substantially U-shape in cross section, and a plate 10 for covering the opened portion, and wherein pressure application mechanism members comprise the ball screw mechanism 11, the pressure application shaft member, the direct acting type rolling bearing 12 which is fixed to the pressure application shaft member, and a rail 13 combined with the direct acting type rolling bearing 12, and wherein the pressure application mechanism members are fixed to the housing body 9, and the plate 10 is fixed to the opened portion of the housing body 9.

Further, the driving unit for pressure application shaft in a welding apparatus is characterized in that a front end of the housing 8 is covered with a front wall 21, and a penetration hole 22 through which the pressure application shaft 7 is inserted is formed on the front wall 21, and no bearing is provided in the penetration hole 22.

Further, the driving unit for pressure application shaft in a welding apparatus is characterized in that a rear end of a fixed arm is fixed to the U-shaped housing body 9.

Further, the driving unit for pressure application shaft in a welding apparatus is characterized in that the U-shaped housing body 9 is formed by an extrusion molded member made of aluminum alloy.

Further, the driving unit for pressure application shaft in a welding apparatus is characterized in that a machining portion for manually rotating a ball screw shaft is formed at the rear end of the ball screw shaft of the ball screw mechanism 11.

PREFERRED EMBODIMENT OF THE INVENTION

Figure 1:
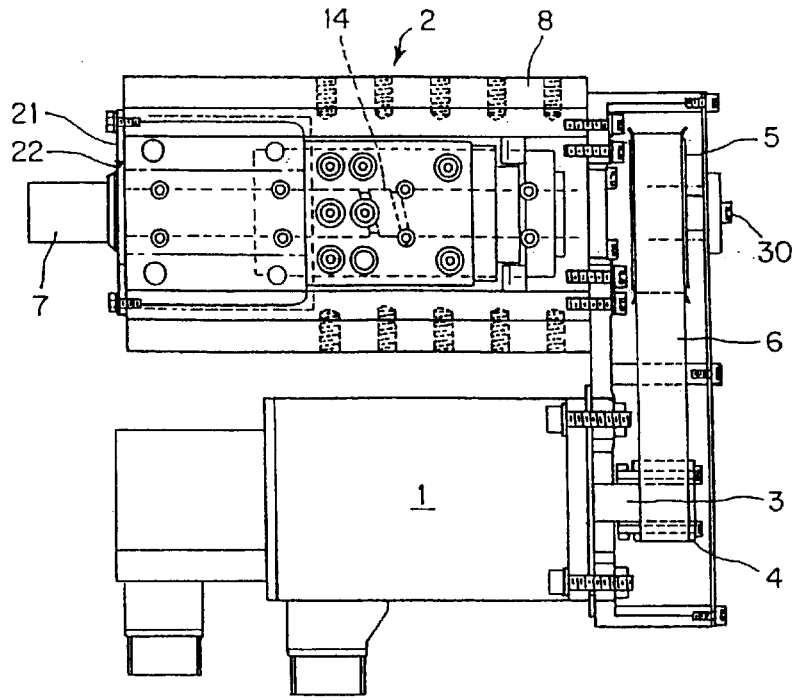
FIG. 1 is a plan view showing a main portion of a driving unit for pressure application shaft in a welding apparatus according to the invention.
Figure 2:
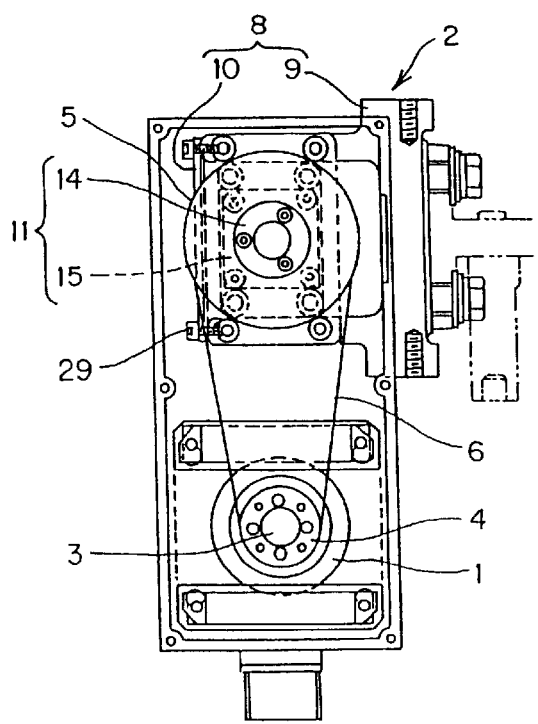
FIG. 2 is a side view of the driving unit for pressure application shaft in FIG. 1.
Figure 3:
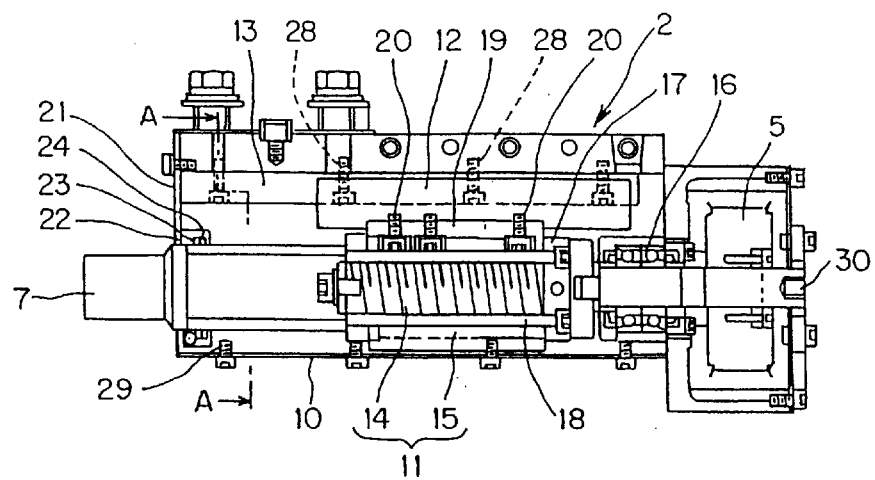
FIG. 3 is a sectional view of the main portion of the driving unit for pressure application shaft in FIG. 1.
Figure 4:
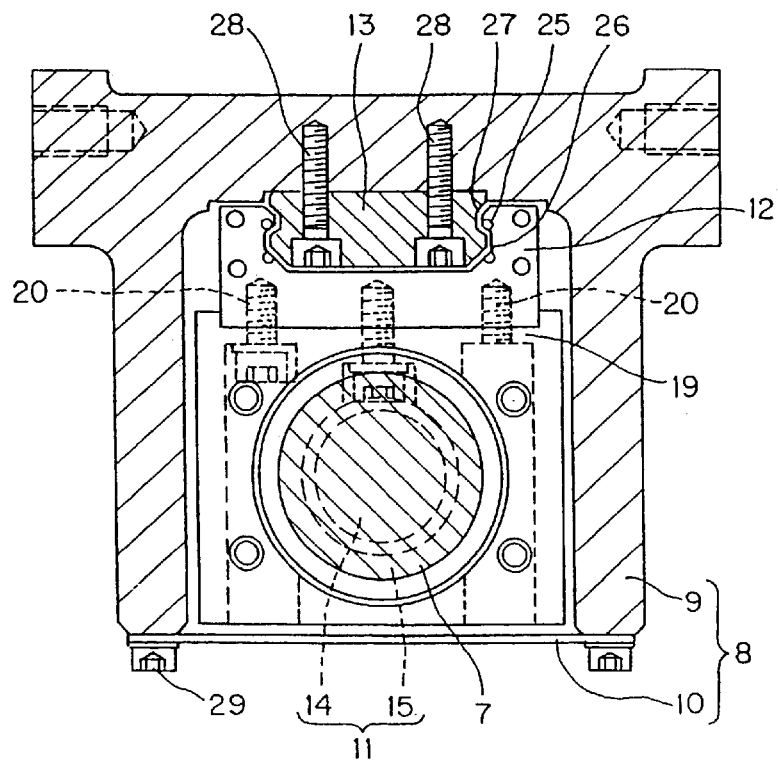
FIG. 4 is a sectional view taken along the line A—A in FIG. 3.

A driving unit for pressure application shaft in a welding apparatus of the invention is described with reference to FIGS. 1 to 4. In these figures, depicted by 1 is a motor for driving a driving unit 2 for pressure application shaft (hereinafter simply referred to as driving unit 2) in a welding apparatus, and a toothed belt 6 is extended between a pulley 4 provided on an output shaft 3 of the motor 1 and a pulley 5 provided on the driving unit 2. Connected to a front end of a pressure application shaft 7 arranged on the driving unit 2 is an electrode (not shown) for applying a pressure to weld a workpiece in the case of a C-type welding gun, a connection member (not shown) connected to a gun arm in the case of an X-type welding gun and a work placing table (not shown) in the case of a welding jig.

Depicted by 8 is a housing for the driving unit 2, and the housing 8 comprises a housing body 9 which is opened at one side in a substantially U-shape cross section, and a plate 10 for covering the opened portion. The housing 9 has a pair of generally parallel side walls 9A and 9B, and a top wall 9C which extends transversely between side walls 9A and 9B. Pressure application mechanism members comprising the pressure application shaft 7 incorporating the ball screw mechanism 11 therein, a direct acting type rolling bearing 12 fixed to the pressure application shaft 7 and a rail 13 combined with the direct acting type rolling bearing 12 are arranged in the housing 8. The housing body 9 is formed by an extrusion molded member made of aluminum alloy.

The ball screw mechanism 11 comprises a screw shaft 14 and a ball nut 15 engaging with the screw shaft 14, wherein the screw shaft 14 penetrates the ball nut 15, and it is supported by a bearing 16 at the rear portion, and the pulley 5 by which a driving force of the motor 1 is transmitted via the toothed belt 6 is fixed to the rear end of the screw shaft 14. A machining portion 30 such as a machining hole or machining projection for manually rotating the screw shaft 14 at the time when the motor 1 is in trouble is formed on the rearmost portion of the screw shaft 14. The ball nut 15 is fixed to the angular portion of the pressure application shaft 7 at the rear end thereof by a plurality of bolts 18, 18 at a square flange 17 provided at the rear portion of the ball nut 15.

The pressure application shaft 7 has projection pieces 19, 19 for holding bolts at the rear end side thereof, and the pressure application shaft 7 and the direct acting type rolling bearing 12 are integrated with each other by bolts 20, 20 which are inserted into the projection pieces 19, 19. The pressure application shaft 7 penetrates a penetration hole 22 formed in a front wall 21 for covering the front end of the housing 8 and extends outwardly of the housing 8, and is connected to, for example, one gun arm of an X-type electric gun so as to apply a pressure to electrodes attached to the tip ends of the gun arm. A bearing is not provided in the penetration hole 22 and the pressure application shaft 7 is inserted into the penetration hole 22 with a gap therebetween, and a scraper 23 and a dust seal 24 are engaged in the gap, and hence the penetration hole 22 is structured as a so-called bearingless one.

If the welding apparatus is a C-type electric gun, the pressure application shaft 7 forms a movable arm, and the tip end of the fixed arm is attached to the housing body 9.

The direct acting type rolling bearing 12 is formed substantially in a U-shape so as to define an upwardly opening recess 12A, and the rail 13 is arranged at the opened side or recess thereof. Grooves 26 for accommodating balls 25, 25 are formed on the portion confronting the rail 13 of the direct acting type rolling bearing 12 at the upper and lower surfaces wherein the grooves 26 cooperate together with projections 27 formed on the rail 13.

The rail 13 is assembled with the direct acting type rolling bearing 12 and fixed to top wall 9C of the housing body 9 by bolts 28, 28, so as to function as a stopper for preventing rotation of the pressure application shaft 7 and as a guide for the reciprocating motion thereof. Depicted by 29, 29, are bolts for fixing the plate 10 to the housing body 9.

In order to reciprocate the pressure application shaft 7 serving as a movable arm of the C-type welding gun, the motor 1 is rotated to rotate the pulley 5 by way of the toothed belt 6 so that the screw shaft 14 is rotated and the ball nut 15 is rotated by the rotation of the screw shaft 14. However, the rotating force of the screw shaft 14 is restrained by the direct acting type rolling bearing 12, and it is converted into a reciprocating motion of the ball nut 15, and hence the pressure application shaft 7 incorporating the ball nut 15 at its rear portion performs forward or rearward motion.

Meanwhile, since the housing 8 comprises a housing body 9 which is opened at one side and has a substantially U-shape in cross section, and a plate 10 for covering the opened portion, and pressure application mechanism members comprised of the pressure application shaft 7 incorporating ball screw mechanism 11 at the rear portion, the pressure application shaft member, the direct acting type rolling bearing 12 which is fixed to the ball screw mechanism 11, and a rail 13 combined with the direct acting type rolling bearing 12 are assembled integrally with one another and are fixed to the housing body 9. The rail 13 and the direct acting type rolling bearing 12 requiring assembly with high precision can be assembled in advance outside the housing 8 so that accurate assembly can be made with ease. Further, since the screw shaft 14, the ball nut 15, the pressure application shaft 7, the direct acting type rolling bearing 12, the rail 13 and so forth can be assembled with one another outside the housing 8, the assembly thereof can be done with ease.

Further, if the rail 13 with which the pressure application mechanism members are assembled is fixed to the reference surface which is machined on the inner surface of the housing body 9 by the bolts 28, 28, the assembling operation of the pressure application mechanism members is completed quickly with high accuracy.

Since the rail 13 can be directly fixed to the housing body 9 without intervening the plate 10, a high-cost plate is not required. Further, since all the parts relating to the accuracy of a central axis in the longitudinal direction through which the pressure application shaft 7 moves which is needed for a smooth and straight motion of the pressure application shaft 7 are assembled with the housing body 9, and the assembling accuracy is automatically attained by taking care of a mechanical machining accuracy of the housing body 9, and hence the accuracy of the passing core can be made with ease.

If the front end of the housing 8 is covered with the front wall 21, and the penetration hole 22 through which the pressure application shaft 7 is inserted is formed in the front wall 21 while the penetration hole 22 is formed as a bearingless one, there does not occur the inconvenience such as biting of a bearing, even if a sputter is attached to the surface of the pressure application shaft 7. Further, if a bending moment caused by the application of eccentric pressure (caused by eccentric alignment between the axis of electrodes or chip of the welding gun and the axis of the pressure application shaft 7) is applied to the pressure application shaft 7, the direct acting type rolling bearing 12 alone can receive a load so that the influence upon welding can be controlled and minimized.

Further, if the rear end portion of the fixed arm is attached to the housing body 9, the entire length of the housing becomes short so that the electric gun can be accommodated compactly.

Further, if the housing body 9 is formed by an extrusion molded member made of aluminum alloy, it can be formed with ease so that a material cost and a mechanical machining cost can be sharply reduced.

Further, if the machining portion 30 for manually rotating the screw shaft 14 is formed on the rear end portion of the screw shaft 14 of the ball screw mechanism, the screw shaft 14 is rotated utilizing the machining portion 30 when the motor is in trouble or the like so that the pressure application shaft 7 is returned to a desired position.

According to the invention, since the housing comprises a housing body which is opened at one side and has a substantially U-shape in cross section, and a plate for covering the opened portion, and pressure application mechanism members comprise the ball screw mechanism, the pressure application shaft member, the direct acting type rolling bearing which is fixed to the ball screw mechanism, and a rail combined with the direct acting type rolling bearing, and wherein the pressure application mechanism members are fixed to the housing body, and the plate is fixed to the opened portion of the housing body, a driving unit for the pressure application shaft in a welding apparatus capable of being assembled with accuracy and ease is achievable and can also be manufactured at low cost.

Since a front end of the housing is covered with a front wall, and a penetration hole through which the pressure application shaft is inserted is formed in the front wall, and no bearing is provided in the penetration hole, there does not occur the inconvenience such as biting of a bearing. Further, if a bending moment is caused by the application of eccentric pressure to the pressure application shaft, the direct acting type rolling bearing alone can receive a load so that the influence upon welding can be controlled and minimized.

A rear end of a fixed arm is fixed to the U-shaped housing body, thereby providing a compact driving unit for pressure application shaft in a welding apparatus.

Since the U-shaped housing body is formed by an extrusion molded member made of aluminum alloy, it can be formed with ease, thereby providing a driving unit for a pressure application shaft in a welding apparatus with a low manufacturing cost.

Since a machining portion for manually rotating a ball screw shaft is formed at the rear end of the ball screw shaft of the ball screw mechanism, the pressure application shaft can be returned to a desired position when the motor is in trouble or the like.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A driving unit for a welding apparatus, said driving unit comprising:
   a pressure application shaft;
   a ball screw assembly for converting rotation of an output shaft of a motor to reciprocating motion of said pressure application shaft;
   a rolling guide arrangement provided between a portion of said pressure application shaft and a housing of said driving unit, said guide arrangement including an elongate rail fixed to said housing and a bearing fixed to said portion of said pressure application shaft and rollingly engaged with said rail, said ball screw assembly, said pressure application shaft, and said guide arrangement being secured to and disposed within said housing; and
   said housing having a transverse cross-sectional configuration which is U-shaped and opens downwardly such that a lower portion of said housing defines a bottom opening, said driving unit further including a plate fixed to said lower portion of said housing so as to close off said bottom opening, said plate being a separate component from said housing and removably attached thereto to permit installation of said ball screw assembly, said pressure application shaft and said guide arrangement as a preassembled unit within said housing through said bottom opening.

2. The driving unit of claim 1, wherein said housing opens frontwardly and is closed off at a front end thereof by a front wall, said front wall defining a hole therein through which said pressure application shaft extends, and no bearing for said pressure application shaft is provided in said hole.

3. The driving unit of claim 1 wherein a rear end of a fixed arm is fixed to said housing.

4. The driving unit of claim 1 wherein said housing comprises an extrusion molded member constructed of aluminum alloy.

5. The driving unit of claim 1 wherein said ball screw assembly includes a rotatable screw shaft, and a machining portion for permitting manual rotation of said screw shaft is disposed at a rear end of said screw shaft.

6. The driving unit of claim 1 wherein said U-shaped configuration of said housing is defined by a pair of generally parallel and laterally spaced side walls and a top wall which extends transversely therebetween, said side and top walls being integrally formed with one another and together defining a one-piece extruded component.

7. The driving unit of claim 6 wherein a front portion of said housing is closed off by a front plate, said front plate defining therein a bearingless opening through which said pressure application shaft projects.

8. The driving unit of claim 7 wherein said rail is fixed to a lower surface of said top wall of said housing.

9. The driving unit of claim 8 wherein said bearing has an upwardly opening U-shape in transverse cross-section so as to define an upwardly opening recess therein in which said rail is engaged.

10. The driving unit of claim 9 wherein said ball screw assembly includes a screw shaft rotatably mounted within said housing and a ball nut engaged with said screw shaft and fixed to said pressure application shaft, said screw shaft being supported at a rear end thereof by a rear bearing.

11. The driving unit of claim 10 wherein said screw shaft mounts a first pulley on said rear end thereof, and said driving unit further includes a motor including an output shaft mounting a second pulley on one end thereof, and a belt which extends between said first and second pulleys so as to drivingly interconnect said screw shaft to said motor.

12. The driving unit of claim 10 wherein said rear end of said screw shaft is configured for permitting manual rotation of said screw shaft.

13. The driving unit of claim 1 wherein said U-shaped configuration of said housing is defined by a pair of laterally spaced side walls and a top wall which extends transversely therebetween, said side and top walls together defining a one-piece component, and said plate being a separate component from said housing.

14. A method of assembling a welding apparatus, said method comprising:
   providing a housing having a transverse cross-sectional configuration which is U-shaped and opens downwardly such that a lower portion of the housing defines a bottom opening;
   providing a pressure application shaft, a ball screw assembly for converting rotation of an output shaft of a motor to reciprocating motion of the pressure application shaft, and a rolling guide arrangement including an elongate rail and a bearing for engagement therewith;
   assembling the pressure application shaft, the ball screw assembly, and the rolling guide arrangement with one another so as to form a unit;
   thereafter installing the assembled unit within the housing through the bottom opening thereof; and
   thereafter removably securing a plate-like member which is a separate component from the housing to the lower portion of the housing to close off the bottom opening thereof.

15. The method of claim 14 wherein said step of providing a housing includes providing a frontwardly opening housing and a front plate defining a bearingless opening therein, and said method includes securing the front plate to the housing to close off the front end thereof, and extending the pressure application shaft through the bearingless opening.

16. The method of claim 14 including securing the rail to a lower surface of the top wall of the housing, and engaging the rail within an upwardly opening recess defined in the bearing.

* * * * *